US010795581B2

(12) United States Patent
Gupta et al.

(10) Patent No.: US 10,795,581 B2
(45) Date of Patent: Oct. 6, 2020

(54) GPT-BASED DATA STORAGE PARTITION SECURING SYSTEM

(71) Applicant: Dell Products L.P., Round Rock, TX (US)

(72) Inventors: Chitrak Gupta, Karnataka (IN); Shekar Babu Suryanarayana, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 68 days.

(21) Appl. No.: 16/258,343

(22) Filed: Jan. 25, 2019

(65) Prior Publication Data

US 2020/0241747 A1 Jul. 30, 2020

(51) Int. Cl.
*G06F 12/00* (2006.01)
*G06F 3/06* (2006.01)
*G06F 9/4401* (2018.01)

(52) U.S. Cl.
CPC ............ *G06F 3/061* (2013.01); *G06F 3/0644* (2013.01); *G06F 3/0683* (2013.01); *G06F 9/4401* (2013.01)

(58) Field of Classification Search
CPC ...... G06F 3/061; G06F 3/0683; G06F 3/0644; G06F 9/4401
See application file for complete search history.

(56) References Cited

U.S. PATENT DOCUMENTS

| 10,635,818 | B1 * | 4/2020 | Rao | G06F 12/0246 |
| 2003/0023826 | A1 * | 1/2003 | McMichael | G06F 3/0601 |
| | | | | 711/173 |
| 2005/0108362 | A1 * | 5/2005 | Weinert | H04L 67/10 |
| | | | | 709/217 |
| 2006/0080517 | A1 * | 4/2006 | Brown | G06F 21/80 |
| | | | | 711/163 |
| 2013/0067242 | A1 | 3/2013 | Lyakhovitskiy et al. | |

OTHER PUBLICATIONS

"Hard Drives and Partitions—Microsoft Docs: Hard Drives and Partitions," May 1, 2017, 7 Pages, https://docs.microsoft.com/en-us/windows-hardware/manufacture/desktop/hard-drives-and-partitions.

(Continued)

*Primary Examiner* — Arvind Talukdar
(74) *Attorney, Agent, or Firm* — Haynes and Boone, LLP (57) ABSTRACT

A GPT hidden partition locking key system includes a server device coupled to the key management system through a network. The server device includes a storage system having a GPT identifying data storage partitions included on a storage system and a hidden partition included on the storage system. A remote access controller device in the server device retrieves a partition locking key from the key management system and provides it for storage in the hidden partition. A BIOS in the server device includes a runtime service that receives a request to provide access for the operating system application to a first data storage partition, accesses the partition locking key in the hidden partition, and uses the partition locking key to unlock the first data storage partition to allow the operating system application to access data stored thereon.

20 Claims, 4 Drawing Sheets

(56) References Cited

OTHER PUBLICATIONS

"Create Single Partition Using Space From Two Different Physical Drives—Windows: Create Single Partition Using Space From Two Different Physical Drives," May 30, 2017, BleepingComputer.com—Microsoft Windows Support—Windows 10 Support, https://www.bleepingcomputer.com/forums/t/648155/create-single-partition-using-space-from-two-different-physical-drives/.

"GUID Partition Table—Wikipedia: GUID Partition Table," Jan. 23, 2019, 10 Pages, Wikipedia®, https://en.wikipedia.org/wiki/GUID_Partition_Table.

* cited by examiner

GPT-BASED DATA STORAGE PARTITION SECURING SYSTEM

BACKGROUND

The present disclosure relates generally to information handling systems, and more particularly to the securing of data storage partitions via a Globally Unique Identifier (GUID) Partition Table (GPT).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server systems in datacenters, may employ enhanced security by locking managed devices within the server system with device locking keys. For example, for many server systems in datacenters, network-based key management systems have been developed to provide for the centralized management of device locking keys used to lock managed devices in the server systems, with the server systems configured to retrieve those device locking keys via in-band methods (e.g., using operating system services provided via an application or agent running in the operating system on the server system) or out-of-band methods (e.g., via a remote access controller that operates independently of the operating system and uses a dedicated network connection to the key management system that is separate from that used by the operating system), and use those device locking keys to unlock managed devices for use. However, the locking of managed devices via device locking keys can raise issues.

For example, managed devices such as Self Encrypting Drives (SEDs) operate to encrypt data for storage, but once the SED is authenticated and unlocked, it remains in an unlocked state in which access to the data is provided until the next power cycle (i.e., removal of power from the SED will cause the data to be encrypted again for storage, and will require a subsequent authentication and unlocking of the SED in order to access the data stored thereon.) The time between SED unlocking and SED power cycling/locking can introduce data security vulnerabilities, as unauthorized operating system applications and/or remote applications may gain access the data stored on the unlocked SED. Conventional device locking systems provide no secure measures or policies that govern the data stored on the SED after the SED is unlocked. Furthermore, many operating system pass-through storage systems provide a mix of SEDs and non-SEDs that are used to provide partitions that can spread across multiple storage devices. In such situations, only the SEDs have the capabilities to protect data, and the data stored on the portion of the partition provided by non-SEDs will not be secure, providing the data stored on partitions spanning mixed SEDs/non-SEDs with only partial security, as conventional device locking systems provide no means for protecting data at a partition level.

Accordingly, it would be desirable to provide an improved data security system.

SUMMARY

According to one embodiment, an Information Handling System (IHS) includes a processing system; and a memory system that is coupled to the processing system and that includes instructions that, when executed by the processing system, cause the processing system to provide a runtime services engine that is configured to: receive a request to provide access for an operating system application to a data storage partition that is provided on a storage system and identified by a Globally Unique Identifier (GUID) Partition Table (GPT) included on the storage system; access a partition locking key in a hidden partition that is provided on the storage system and identified by the GPT; and unlock, using the partition locking key, the data storage partition to allow the operating system application to access data stored on the data storage partition.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
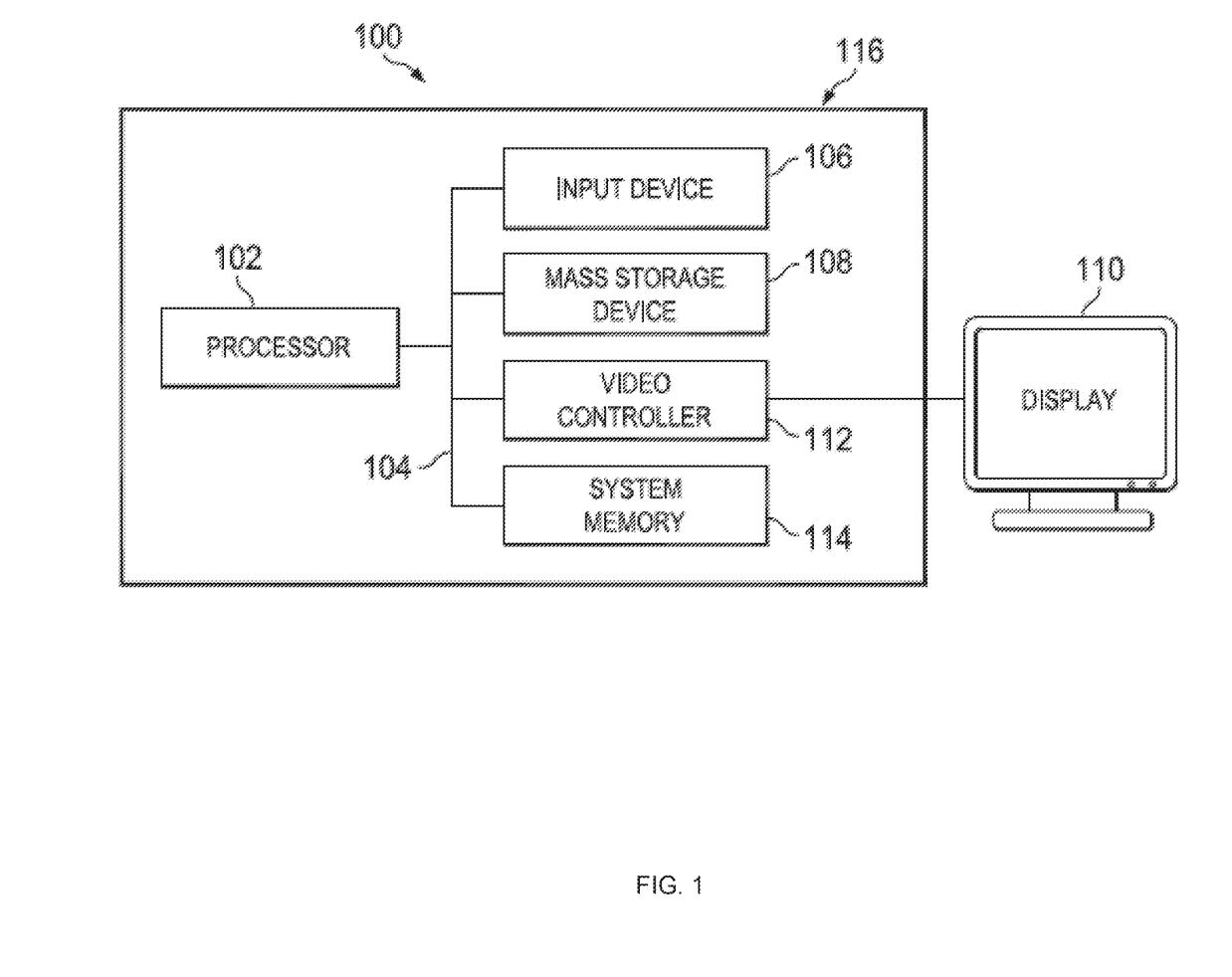
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
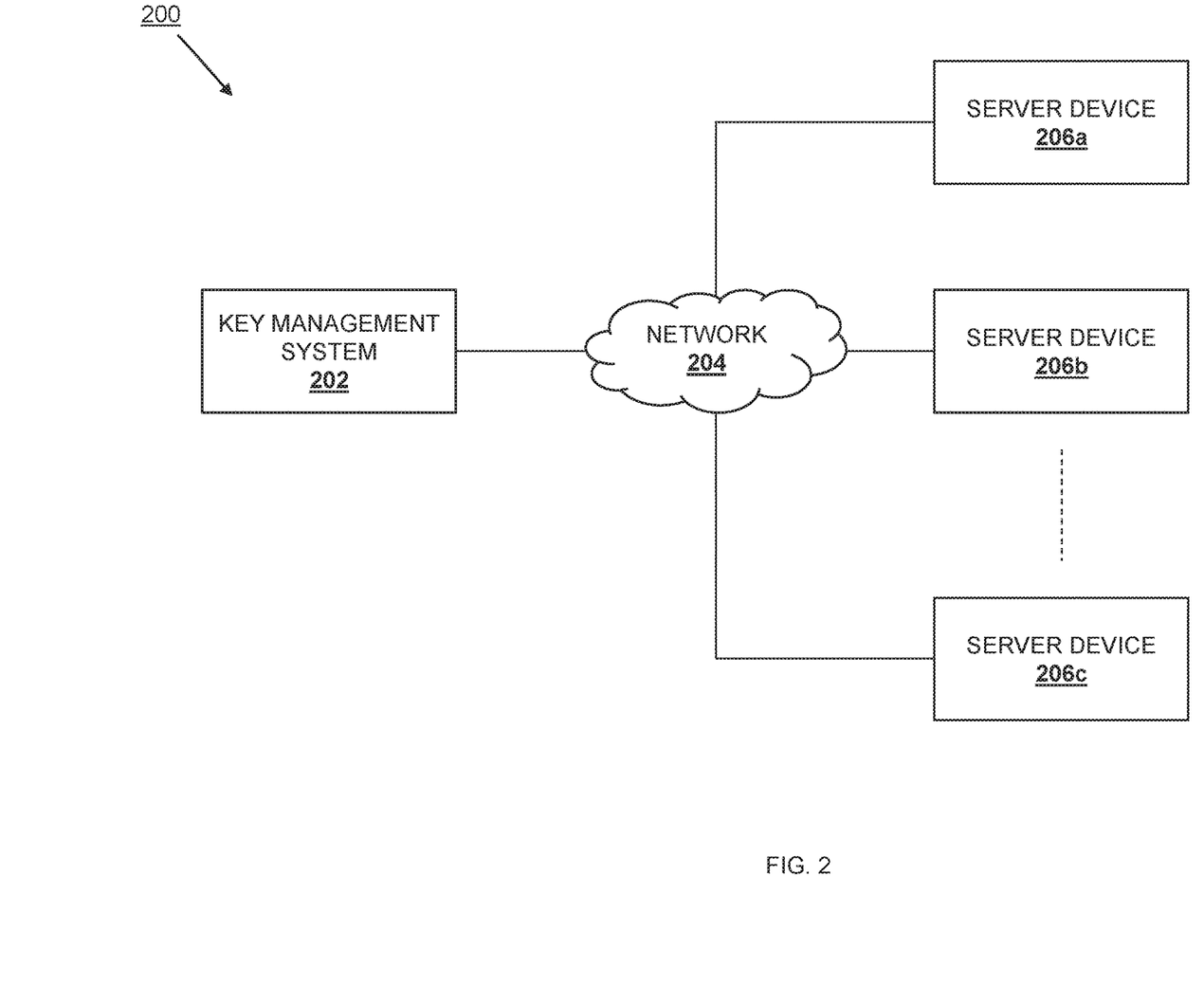
FIG. 2 is a schematic view illustrating an embodiment of a GPT-based data storage partition security system.

Referring now to FIG. 2, an embodiment of a Globally Unique Identifier (GUID) Partition Table (GPT)-based data storage partition security system 200 is illustrated. As discussed below, the GPT-based data storage partition security system 200 may include a management system that may be provided by one or more of the IHSs 100 discussed above with reference to FIG. 1, and/or that may include any or all of the components of the IHS 100. In the illustrated embodiment, the management system is provided by a key management system 202 that may include one or more server devices, although other computing devices may be utilized to provide the management system while remaining within the scope of the present disclosure as well. In a specific example, the key management system 202 may be provided by one or more server devices that are configured according to the Key Management Interoperability Protocol (KMIP) to act as a KMIP server, and one of skill in the art in possession of the present disclosure will recognize that the KMIP an extensible communication protocol that defines message formats for the manipulation of cryptographic keys via server device(s) providing the key management system 202, which facilitates data encryption by simplifying encryption key management. As such, keys may be created on a server and then retrieved, possibly wrapped by other keys, with both symmetric and asymmetric keys supported, and including the ability to sign certificates. One of skill in the art in possession of the present disclosure will recognize that the KMIP also allows for clients to ask a server to encrypt or decrypt data, without needing direct access to the key. However, while a specific protocol is discussed herein as being utilized by the GPT-based data storage partition security system 200, one of skill in the art in possession of the present disclosure will recognize that keys may be managed according to the teachings of the present disclosure via a variety of key management protocols while remaining within the scope of the present disclosure as well.

In the illustrated embodiment, the key management system 202 is coupled to a network 204 that may be provided by a Local Area Network (LAN), the Internet, and/or any other network that would be apparent to one of skill in the art in possession of the present disclosure. Furthermore, a plurality of managed systems may be coupled to the management system of the present disclosure via the network 204. In an embodiment, any or all of the managed systems may be provided by the IHS 100 discussed above with reference to FIG. 1, and/or may include any or all of the components of the IHS 100. For example, in the illustrated embodiment, the managed systems are provided by server devices 206a, 206b, and up to 206c, each of which is coupled through the network 204 to the key management system 202. In a specific example, the server devices 206a-c may be configured according to the KMIP to act as KMIP clients. While one of skill in the art in possession of the present disclosure will recognize that the embodiment discussed below describe a datacenter including a datacenter network that couples together the key management system and the server devices, any of a variety of managed systems may be coupled to a management system via a network while operating according to the teachings of the present disclosure, and those embodiments are envisioned as falling within the scope of the present disclosure as well.

Figure 3:
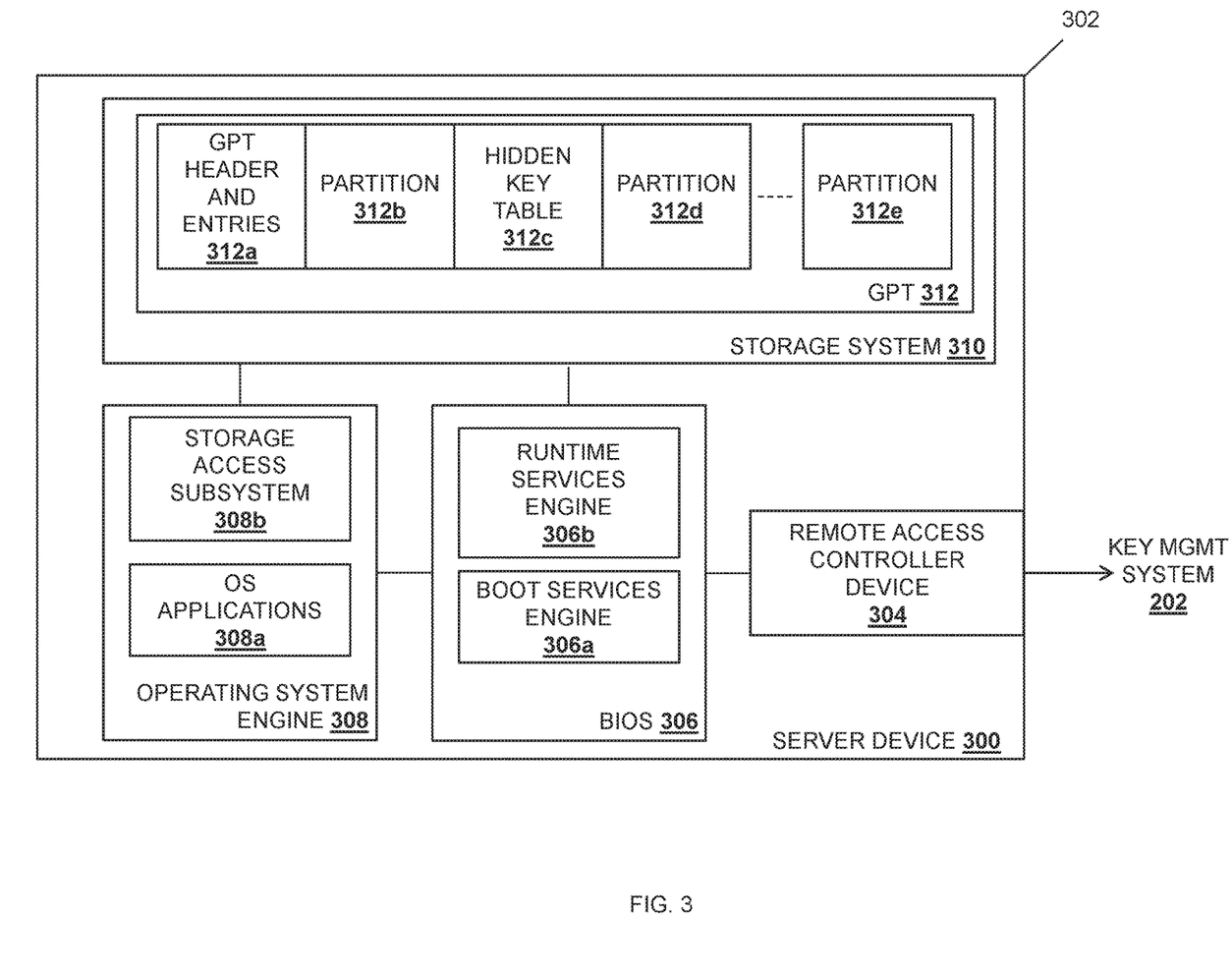
FIG. 3 is a schematic view illustrating an embodiment of a server device that may be provided in the GPT-based data storage partition security system of FIG. 2.

Referring now to FIG. 3, an embodiment of a managed system provided by a server device 300 is illustrated. The server device 300 may be any or all of the server devices 206a-c discussed above with reference to FIG. 2 and, as such, may be provided by the IHS 100 discussed above with reference to FIG. 1, and/or may include any or all of the components of the IHS 100. In the illustrated embodiment, the server device 300 includes a chassis 302 that houses the components of the server device 300, only some of which are illustrated in FIG. 3. In the illustrated embodiment, the chassis 302 may house at least one processing system (not illustrated, but which may include the processor 102 discussed above with reference to FIG. 1) and at least one memory system (not illustrated, but which may include the memory 114 discussed above with reference to FIG. 1) that is coupled to the at least one processing system and that includes instructions that, when executed by the at least one processing system, cause the at least one processing system to provide at least one data storage partition security subsystem that is configured to perform the functionality of the data storage partition security subsystems discussed below.

For example, in the illustrated embodiment, the chassis 302 houses a remote access controller device 304 that may provide a portion of the data storage partition security subsystem described herein. In a specific example, the remote access controller device 304 may be provided by, for example, an integrated DELL® Remote Access Controller (iDRAC®) available from DELL® Inc. of Round Rock, Tex., United States. As would be understood by one of skill in the art in possession of the present disclosure, remote access controller devices may provide an out-of-band management platform for server systems (e.g., via a separate expansion card, or integrated into the main circuit board as with the iDRAC® discussed above), and may operate using remote access controller resources that are separate from the server resources utilized by the server device 300, while providing a browser-based-interface and/or command-line-interface for allowing users to manage and monitor the server device 300. As discussed below, the remote access controller device 304 may include a remote access controller processing system (not illustrated, but which may include the processor 102 discussed above with reference to FIG. 1) and a remote access controller memory system (not illustrated, but which may include the memory 114 discussed above with reference to FIG. 1) that is coupled to the remote access controller processing system and that includes instructions that, when executed by the remote access controller processing system, cause the remote access controller processing system to provide the remote access controller that is configured to perform the functionality of the remote access controllers discussed below. As illustrated in FIG. 2, the remote access controller device 304 may include connectivity to the key management system 202 (e.g., an EKMS) that allows for the dynamic syncing of security keys in the hidden key table/hidden partition, and their use for unlocking storage areas, as discussed below.

In the illustrated embodiment, the chassis 302 also houses a BIOS 306 that is coupled to the remote access controller 304 and that provides a portion of the data storage partition security subsystem described herein. As would be understood by one of skill in the art in possession of the present disclosure, a BIOS may be provided by non-volatile firmware and may be used to perform hardware initialization during a booting process (e.g., power-on startup) for the server device 300, as well as provide runtime services for operating systems and applications running on the server device 300 during runtime. Furthermore, while discussed as a BIOS below, one of skill in the art in possession of the present disclosure will recognize that the BIOS 306 may be provided according to the Unified Extensible Firmware Interface (UEFI) specification, which defines a software interface between an operating system and platform firmware in the server device 300, and was provided to replace the BIOS firmware interface while providing legacy support for BIOS services. As discussed below, the BIOS 306 may include a BIOS processing system (not illustrated, but which may include the processor 102 discussed above with reference to FIG. 1 and/or components with similar processing functionality) and a BIOS memory system (not illustrated, but which may include the memory 114 discussed above with reference to FIG. 1 and/or components with similar memory functionality) that is coupled to the BIOS processing system and that includes instructions that, when executed by the BIOS processing system, cause the BIOS processing system to provide a boot services engine 306a that is configured to perform boot operations, and a runtime services engine 306b that is configured to perform runtime operations.

In the illustrated embodiment, the chassis 302 may also include an operating system (OS) processing system (not illustrated, but which may include the processor 102 discussed above with reference to FIG. 1 and/or components with similar processing functionality) and an OS memory system (not illustrated, but which may include the memory 114 discussed above with reference to FIG. 1 and/or components with similar memory functionality) that is coupled to the OS processing system and that includes instructions that, when executed by the OS processing system, cause the OS processing system to provide an OS engine 308 that is configured to provide an OS, as well as a plurality of OS applications 308a, a storage access subsystem 308b, and/or any other OS subsystems that would be apparent to one of skill in the art in possession of the present disclosure.

A storage system 310 is coupled to each of the BIOS 306 (e.g., via a coupling to the BIOS processing system) and the OS engine 308 (e.g., via a coupling to the OS processing system), and may be provided by one or more storage devices. The storage system 310 includes includes a Globally Unique Identifier (GUID) Partition Table (GPT) 312. As would be understood by one of skill in the art in possession of the present disclosure, a GPT provides a standard for the layout of a partition table on a storage device used in server devices (e.g., a hard disk drive, a solid-state drive, etc.) using globally unique identifiers, and are part of the UEFI standard discussed above, but are also utilized with BIOSs due to the limitations of Master Boot Record (MBR) partition tables. In the illustrated embodiment, the GPT 312 includes GPT header(s) and GPT entr(ies) 312a, and identifies a partition 312b provided on the storage system 310, a hidden key table 312b included in a hidden partition provided on the storage system 310, a partition 312c provided on the storage system 310, and up to a partition 312d provided on the storage system 310. However, while a specific server device 300 has been illustrated and described, one of skill in the art in possession of the present disclosure will recognize that server devices may include a variety of components and/or component configurations while remaining within the scope of the present disclosure as well.

Figure 4:
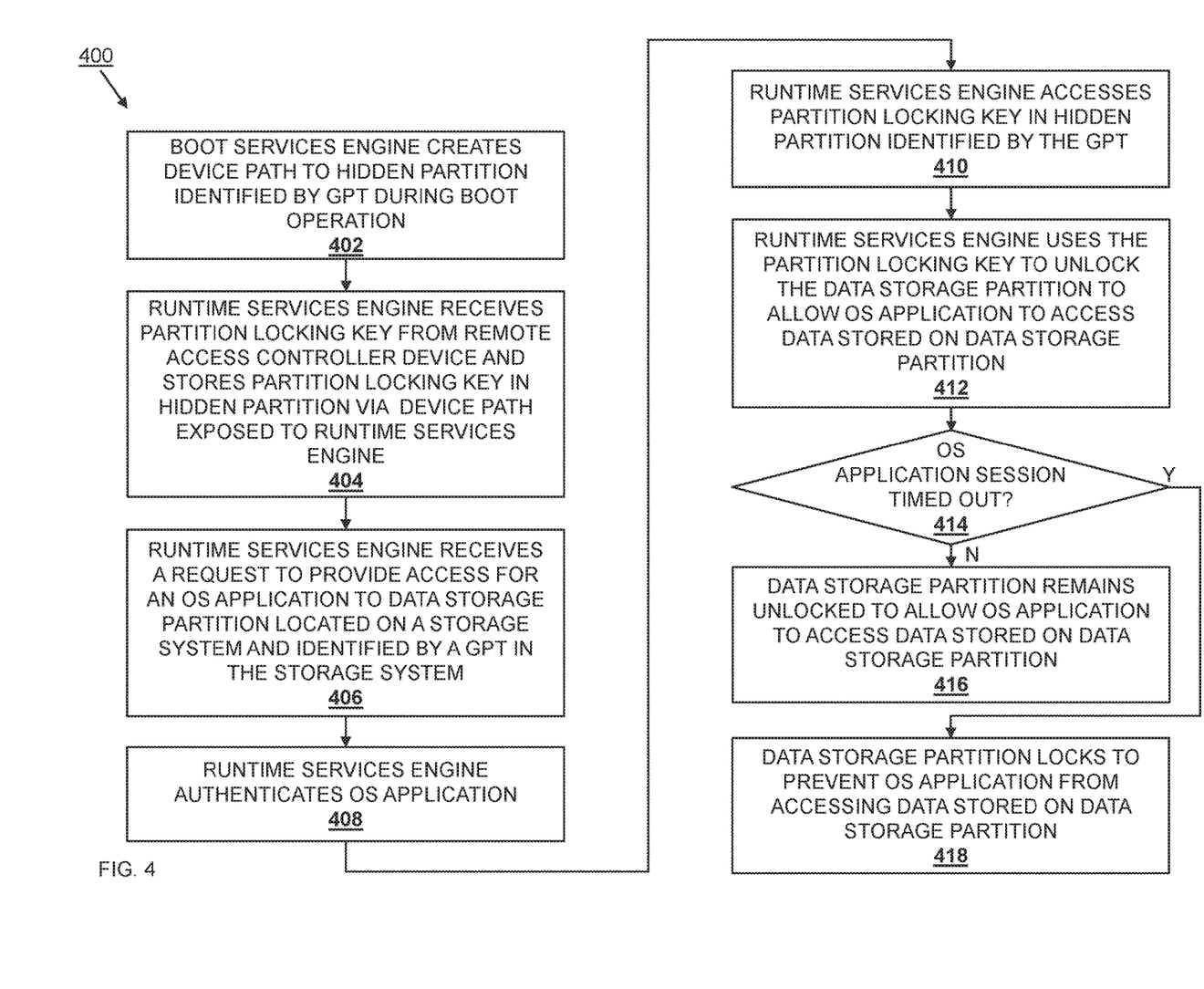
FIG. 4 is a flow chart illustrating an embodiment of a method for providing for the security of data storage partitions via a GPT.

Referring now to FIG. 4, an embodiment of a method 400 for providing for the security of data storage partitions via a GPT is illustrated. As discussed below, embodiments of the systems and methods of the present disclosure provide a Globally Unique Identifier (GUID) Partition Table (GPT) in a storage system that identifies a hidden partition on the storage system that includes a hidden key table that is used to secure access to data storage partition(s) included on the storage system and identified in the GPT. For example, the hidden key table included in the hidden partition may be identified by the GPT, and a GPT entry in the GPT may be reserved to index into the hidden key table. During pre-boot/boot operations of a server device, a boot services engine provided by a Basic Input/Output System (BIOS) may create a device path to the hidden key table and enumerate the device path such that it is exposed to a runtime services engine provided by the BIOS during runtime. The GPT entry may be marked as hidden by the boot services engine in order to make the hidden key table inaccessible to the operating system provided by the server device during runtime/post-boot, but the device path will allow the runtime services engine to access the hidden key table during runtime/post-boot. The hidden key table may store key management policies, data storage partition level security policies, locking keys, and/or any other key management information known in the art. When an attempt is made by an operating system application to access data stored on a data storage partition identified by the GPT during runtime, a dynamic event may be generated that triggers the runtime services engine to retrieve a partition locking key and use it to unlock the data storage partition and open a secure channel to that data storage partition. The session may then be initiated for the operating system application to access the data storage partition, ensuring that only the authenticated OS application may access that data storage partition during a session access time period, following which the OS application must be re-authenticated for continued access to the data storage partition. As such, partition level securing of data is enabled, which may be extended to partitions that span multiple storage devices in the storage system.

The method 400 begins at block 402 where a boot services engine creates, during boot operations, a device path to a hidden partition identified by a GPT. In an embodiment, at or before block 402, the server device 300 boots, resets, and/or otherwise initializes, and the boot services engine 306a provided by the Basic Input/Output System (BIOS) 306 included in the server device 300 performs boot operations. During boot operations for the server device 300, the boot services engine 306a provided by the BIOS 306 may operate to create a device path to the hidden key table 312c provided in the hidden partition on the storage system 310 and identified in the GPT 312. For example, the boot services engine 306a provided by the BIOS 306 may operate to create the device path to the hidden key table 312c and enumerate the device path in order to configure the hidden key table 312c to be exposed to the runtime services engine 306b during runtime of the server device 300 (e.g., if the runtime services engine 306b provides valid credentials). In a specific example, a GPT entry included in the GPT header(s) and entr(ies) 312a of the GPT 312 may be reserved and configured to index into the hidden key table 312c, with the GPT entry marked as hidden by the boot services engine 306a provided by the BIOS 306 in order to make the hidden key table 312c inaccessible to the operating system engine 308 during runtime of the server device 300.

In a specific example, the hidden key table may be created during pre-operations boot using boot services provided by the BIOS, and that hidden key table may be exported to runtime services provided by the BIOS. Following initial creation, the hidden key table will be empty with no entries other than an entry with a key to unlock the hidden key table itself (which may be performed by runtime services or boot services provided by the BIOS), and once the hidden key table is unlocked, it is open for the creation and addition of new entries (either at runtime or during boot operations.) Furthermore, the creation of the device path at block 402 may utilize a device path protocol provided by the UEFI that includes a data structure description of where a device is present in a platform/system. In this example, the device path may provide a complete path to access a storage area (e.g., a partition, disk, or other storage region), and may be created by OS/OS application in a Secure GPT storage area during OS runtime. As described herein, a runtime service provided by the BIOS may be triggered to sync the storage area attributes with via the UEFI Hidden Key Table Protocol described in the present disclosure. Those storage area attributes may include storage offsets, access types, and may be created via the UEFI Hidden Key Table Protocol dynamically in an entry in Hidden Key Table (which may be created in pre-boot using a boot service provided by the BIOS). The entries provided in the hidden key table are utilized for enabling secure access for the storage area by dynamically fetching a security key via EKMS/iDRAC communications when an entry is added, locking the storage area with that security key, and then storing that security key in the hidden key table associated with that entry. Based on associated policies stored in the hidden key table, the security key can either be deleted or kept in the hidden key table, and if the key is deleted, the runtime services provided by the BIOS will retrieve the key via iDRAC/EKMS communications to unlock the storage area.

The method 400 then proceeds to block 404 where a runtime services engine receives a partition locking key from a remote access controller device and stores the partition locking key in the hidden partition via the device path that is exposed to the runtime services engine. In an embodiment, following block 402, the server device 300 may enter runtime (i.e., subsequent to the BIOS completing boot operations) such that the operating system engine 308 and the BIOS 306 are operating. At block 404, the remote access controller provided by the remote access controller device 304 included in the server device 300 may operate to retrieve, through the network 204, a partition locking key from the key management system 202. As discussed above, the key management system 202 may operate as a KMIP server and the server devices 300 may operate as KMIP clients, and one of skill in the art in possession of the present disclosure will recognize how a remote access controller provided by the remote access controller device 304 in the server device 300 may operate to retrieve a locking key from the key management system 202. In addition, at block 404, the remote access controller provided by the remote access controller device 304 may also retrieve locking key management policies, partition level security policies, and/or any other data storage partition security information from the key management system 202. In a specific example, data storage partition security information included in entries in the hidden key table may be published during boot operations by the boot services provided by the BIOS, and that data storage partition security information may be dynamically read by the runtime services provided by the BIOS during runtime to enable access to the particular storage area accordingly. Such data storage partition security information may include policies defining a timeout secure session for an OS application; policies defining the deletion or saving of the network security key (e.g., provided by an EKMS) used for unlocking the data storage partition, as well as for renewing the security keys dynamically; policies defining the enablement of access to multiple OS applications with a common security key, as well as timeout sessions for each of those OS applications, policies defining the locating of EKMS services and the obtaining of keys per storage area, and/or any other security information that would be apparent to one of skill in the art in possession of the present disclosure.

At block 404, the runtime services engine 306b provided by the BIOS 306 may receive the partition locking key from the remote access controller provided by the remote access controller device 304, and may operate to store that partition locking key in the hidden key table 312c identified in the GPT 312. In addition, the runtime services engine 306b provided by the BIOS 306 may receive the locking key management policies, partition level security policies, and/or any other data storage partition security information from the remote access controller provided by the remote access controller device 304, and may operate to store those locking key management policies, partition level security policies, and/or any other data storage partition security information in the hidden key table 312c identified in the GPT 312. However, while the storage of partition locking keys, locking key management policies, partition level security policies, and/or any other data storage partition security information has been described as being performed during runtime of the server device 300, such operations may be performed during the boot operations of the server device 300 as well. For example, during boot operations and prior to entering runtime of the server device 300, the boot services engine 306a provided by the BIOS 306 may receive the partition locking key, the locking key management policies, partition level security policies, and/or any other data storage partition security information from the remote access controller provided by the remote access controller device 304, and may operate to store those locking key management policies, partition level security policies, and/or any other data storage partition security information in the hidden key table 312c identified in the GPT 312.

At block 404, the partition locking key may be utilized to lock one or more data storage partitions (i.e., any of the data storage partitions 312b, 312d, and up to 312e identified in the GPT 312) such that the data stored on those data storage partition(s) may not be accessed unless those data storage partition(s) are unlocked. In some examples, the partition locking key received at block 404 may be utilized to lock a single data storage partition included on the storage system 310 and identified by the GPT 312. In other examples, the partition locking key received at block 404 may be utilized to lock multiple data storage partitions included on the storage system 310 and identified by the GPT 312. In yet other examples, the partition locking key received at block 404 may be utilized to lock one or more data storage partitions that are included on storage devices/systems provided on different server devices (e.g., the server devices 206*a* and 206*b*) and that are identified by a GPT that is shared by/distributed to each of those server devices. As such, the partition locking keys of the present disclosure may be utilized to secure data on a single partition/portion of a storage system/storage device, multiple partitions/portions of a storage system/storage device, and/or one or more partitions/portion of multiple storage systems/storage devices. Thus, following block 404, the data storage partition 312*b* included in the storage system 310 and identified by the GPT 312 may be locked with a partition locking key, and that partition locking key may be stored in a hidden key table 312*c* provided as part of a hidden partition included in the storage system 310 and identified by the GPT 312, with that hidden key table 312*c* also storing locking key management policies, partition level security policies, and/or any other data storage partition security information for providing the data storage partition security described herein.

The method 400 then proceeds to block 406 where the runtime services engine receives a request to provide access for an OS application to a data storage partition that is located on a storage system and identified by a GPT in that storage system. In an embodiment, at block 406 and during runtime of the server device 300, one of the operating system applications 308*a* provided by the operating system engine 308 included in the server device 300 may request access to the data stored in the data storage partition 312*b*. For example, an operating system application may attempt to utilize the storage access subsystem 308*b* (e.g., a disk block access subsystem) provided by the operating system engine 308 to access data stored on the data storage partition 312*b*. In response, the storage access subsystem 308*b* may send a request to the runtime services engine 306*b* provided by the BIOS 306 for access to the data stored on the data storage partition 312*b*. As discussed below, the storage access subsystem 308*b* may retrieve authentication information from the operating system application that is requesting access to the data stored on the data storage partition 312*b*, and provide that authentication information to the runtime services engine 306*b* provided by the BIOS 306 as part of the request to the access to the data stored on the data storage partition 312*b*.

The method 400 then proceeds to block 408 where the runtime services engine authenticates the OS application. In an embodiment, at block 408 and in response to receiving the request from the storage access subsystem 308*b* to provide access for the OS application to the data stored on the data storage partition 312*b*, the runtime services engine 306*b* provided by the BIOS 306 may operate to authenticate the OS application for access to the data stored on the data storage partition 312*b*. As discussed above, the runtime services engine 306*b* provided by the BIOS 306 may be required to include valid credentials that provide for the exposure of the device path (which was created during boot operations) to the runtime services engine 306*b* during runtime in order to be able to read data in the hidden key table 312*c*. Thus, at block 408, the runtime services engine 306*b* with valid credentials may create a secure authenticated channel between the runtime services engine 306*b* and the hidden key table 312*c*. The runtime services engine 306*b* may then determine that the authentication information for the operating system application (which were received from the storage access subsystem 308*b* at block 406 as discussed above) and the partition level security policies in the hidden key table 312*c* indicate that the operating system application requesting access to the data on the data storage partition 312*b* is authenticated for accessing that data. As will be appreciated by one of skill in the art in possession of the present disclosure, in the event the operating system application cannot be authenticated for accessing the data stored on the data storage partition, the operating system application may be denied access to that data.

The method 400 then proceeds to block 410 where the runtime services engine accesses the partition locking key in the hidden partition identified by the GPT. In an embodiment, at block 410 and in response to creating the secure authenticated channel between runtime services engine 306*b* and the hidden key table 312*c* (and authenticating the operating system application for access to the data on the data storage partition), the runtime services engine 306*b* may access the partition locking key stored in the hidden key table 312*c* included in the hidden partition on the storage system 310 (e.g., via the secure authenticated channel.)

The method 400 then proceeds to block 412 where the runtime services engine uses the partition locking key to unlock the data storage partition to allow the OS application to access data stored on the data storage partition. In an embodiment, at block 412, the runtime services engine 306*b* provided by the BIOS 306 operates to use the partition locking key accessed at block 410 to unlock the data storage partition 312*b* in order to allow the operating system application to access the data stored on that data storage partition 312*b*. One of skill in the art in possession of the present disclosure will recognize how the partition locking key that is stored in the hidden key table 312*c* and that was used to lock the data storage partition 312*b* may be subsequently utilized to unlock that data storage partition 312*c*. In an embodiment, the unlocking of the data storage partition 312*b* in order to provide the operating system application access to the data stored thereon may create a secure operating system application session between the data storage partition 312*b* and the operating system application via the storage access subsystem 308*b*. For example, the secure operating system application session may be defined by the partition level security policies stored in the hidden key table, and may define a session time period associated with the unlocking of the data storage partition 312*b* and after which the data storage partition 312*b* will be once again locked (and require subsequent unlocking in order to obtain access to the data stored thereon.) Furthermore, the secure operating system application session may be specific to the operating system application that was authenticated at block 408 for access to the data stored on the data storage partition 312*b*, and thus other operating system applications attempting to access the data stored on the data storage partition 312*b* via the secure operating system application session will be unable to. In an embodiment, per-session storage area locking (as described above) may be tightly coupled with a single OS application such that only that OS application will be allowed to access that storage area during the session, as the storage area will be unlocked only for authorized OS applications. As such, following block 412, the operating system application is provided access to the data stored on the data storage partition 312*b*.

The method 400 then proceeds to decision block 414 where it is determined whether an OS application session has timed out. In an embodiment, at decision block 414, the secure operating system application session may continue as long as the session time period (discussed above) has not expired. As such, at decision block 414, if it is determined that the OS application session has not timed out, the method 400 proceeds to block 416 where the data storage partition remains unlocked to allow the OS application to access data stored on the data storage partition 312*b*. Thus, at block 416, the operating system application may access any of the data stored on the data storage partition 312*b*, and in some examples may write data to the data storage partition 312*b* as well.

If, at decision block 414, it is determined that the OS application session has timed out, the method 400 proceeds to block 418 where the data storage partition locks to prevent the OS application from accessing data stored on the data storage partition. In an embodiment, at block 418 and following the expiration of the session time period, the data storage partition will lock and prevent the OS application from accessing the data stored on the data storage partition 312*b*. Thus, at block 416, the operating system application may no longer access any of the data stored on the data storage partition 312*b*, and blocks 406, 408, 410, and 412 of the method 400 must be performed again in order for the operating system application to access the data stored on the data storage partition 312*b* again.

Thus, systems and methods have been described that provide for the securing of data storage partitions via partition locking keys stored in a hidden partition identified in a GPT. Embodiments of the systems and methods of the present disclosure provide a GPT in a storage system that identifies a hidden key table that is used to secure access to the data storage partitions identified in the GPT, with a GPT entry in the GPT reserved to index into the hidden key table. During pre-boot/boot operations, a boot services engine provided by a BIOS may create a device path to the hidden key table and enumerate the device path such that it is exposed to a runtime services engine provided by the BIOS during runtime, with the GPT entry marked as hidden by the boot services engine in order to make the hidden key table inaccessible to the operating system during runtime/post-boot. The hidden key table may store key management policies, data storage partition level security policies, partition locking keys, and/or any other data storage partition security information, and when an attempt is made by an operating system application to access a data storage partition identified by the GPT during runtime, a dynamic event may be generated that triggers the runtime services engine authenticate the operating system application for use of a secure access session for the data storage partition. The secure access session is configured such that only the authenticated OS application may access that data storage partition during a session access time period, following which the OS application must be re-authenticated for continued access to the data storage partition. As such, partition level securing of data is enabled, which may be extended to partitions that span multiple storage systems Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Globally Unique Identifier (GUID) Partition Table (GPT) partition locking key system, comprising:
    a key management system; and
    a server device that is coupled to the key management system through a network, wherein the server device includes:
        a storage system including a Globally Unique Identifier (GUID) Partition Table (GPT) identifying a plurality of data storage partitions provided on the storage system and a hidden partition provided on the storage system;
        a remote access controller device that is configured to retrieve a partition locking key through the network from the key management system and provide the partition locking key for storage in the hidden partition identified by the GPT;
        an operating system engine that is configured to provide an operating system application; and
        a Basic Input/Output System (BIOS) that includes a runtime service that is configured to:
            receive a request to provide access for the operating system application to a first data storage partition of the plurality of data storage partitions that is provided on the storage system and identified by the GPT;
            access the partition locking key in the hidden partition that is provided on the storage system and identified by the GPT; and
            unlock, using the partition locking key, the first data storage partition to allow the operating system application to access data stored on the first data storage partition.

2. The system of claim 1, wherein the unlocking of the first data storage partition using the partition locking key includes unlocking the first data storage partition for a session time period defined by a GPT entry in the GPT, and wherein the first data storage partition is configured to be locked following the session time period to prevent access to data stored on the first data storage partition.

3. The system of claim 1, wherein the operating system engine is configured to provide a storage access subsystem, and wherein the storage access subsystem is configured to:
    receive a first request from the operating system application to access the first data storage partition; and
    provide a second request to the BIOS to provide access for the operating system application to the first data storage partition.

4. The system of claim 1, wherein the BIOS is configured to:
    create a device path to the hidden partition identified by the GPT during a boot operation, wherein the device path is configured to be exposed to the runtime service provided by the BIOS during runtime operations.

5. The system of claim 1, wherein the runtime service is configured to:
    authenticate the operating system application for access to the first data storage partition; and
    unlock, in response to authenticating the operating system application, the first data storage partition to allow the operating system application to access data stored on the first data storage partition.

6. The system of claim 1, wherein the BIOS is configured to:
    receive the partition locking key from the remote access controller device; and
    store the partition locking key in the hidden partition identified by the GPT.

7. An Information Handling System (IHS), comprising:
a processing system; and
a memory system that is coupled to the processing system and that includes instructions that, when executed by the processing system, cause the processing system to provide a runtime services engine that is configured to:
receive a request to provide access for an operating system application to a data storage partition that is provided on a storage system and identified by a Globally Unique Identifier (GUID) Partition Table (GPT) included on the storage system;
access a partition locking key in a hidden partition that is provided on the storage system and identified by the GPT; and
unlock, using the partition locking key, the data storage partition to allow the operating system application to access data stored on the data storage partition.

8. The IHS of claim 7, wherein the unlocking of the data storage partition using the partition locking key includes unlocking the data storage partition for a session time period defined by a GPT entry in the GPT, and wherein the data storage partition is configured to be locked following the session time period to prevent access to data stored on the data storage partition.

9. The IHS of claim 7, wherein the runtime services engine is configured to:
receive the request to provide access for the operating system application to the data storage partition from a storage access subsystem, wherein the request is generated by the storage access subsystem in response to a communication from the operating system application to access the data storage partition.

10. The IHS of claim 7, wherein the memory system includes instructions that, when executed by the processing system, cause the processing system to provide a boot engine that is configured to:
create a device path to the hidden partition identified by the GPT during a boot operation, wherein the device path is configured to be exposed to the runtime service engine during runtime operations.

11. The IHS of claim 7, wherein the runtime services engine is configured to:
authenticate the operating system application for access to the data storage partition; and
unlock, in response to authenticating the operating system application, the data storage partition to allow the operating system application to access data stored on the data storage partition.

12. The IHS of claim 7, wherein the runtime services engine is configured to:
receive the partition locking key from a remote access controller device; and
store the partition locking key in the hidden partition identified by the GPT.

13. The IHS of claim 7, wherein the memory system includes instructions that, when executed by the processing system, cause the processing system to provide a boot engine that is configured to:
receive the partition locking key from a remote access controller device; and
store the partition locking key in the hidden partition identified by the GPT.

14. A method for storing and providing partition locking keys, comprising:
receiving, by a runtime services engine provided by a Basic Input/Output System (BIOS), a request to provide access for an operating system application to a data storage partition that is provided on a storage system and identified by a Globally Unique Identifier (GUID) Partition Table (GPT) included on the storage system;
accessing, by the runtime services engine, a partition locking key in a hidden partition that is provided on the storage system and identified by the GPT; and
unlocking, by the runtime services engine using the partition locking key, the data storage partition to allow the operating system application to access data stored on the data storage partition.

15. The method of claim 14, wherein the unlocking of the data storage partition using the partition locking key includes unlocking the data storage partition for a session time period defined by a GPT entry in the GPT, and wherein the data storage partition is configured to be locked following the session time period to prevent access to data stored on the data storage partition.

16. The method of claim 14, further comprising:
receiving, by then runtime services engine, the request to provide access for the operating system application to the data storage partition from a storage access subsystem, wherein the request is generated by the storage access subsystem in response to a communication from the operating system application to access the data storage partition.

17. The method of claim 14, further comprising:
creating, by a boot engine provided by the BIOS, a device path to the hidden partition identified by the GPT during a boot operation, wherein the device path is configured to be exposed to the runtime service engine during runtime operations.

18. The method of claim 14, further comprising:
authenticating, by the runtime services engine, the operating system application for access to the data storage partition; and
unlocking, by the runtime services engine, in response to authenticating the operating system application, the data storage partition to allow the operating system application to access data stored on the data storage partition.

19. The method of claim 14, further comprising:
receiving, by the runtime services engine, the partition locking key from a remote access controller device; and
storing, by the runtime services engine, the partition locking key in the hidden partition identified by the GPT.

20. The method of claim 14, further comprising:
receiving, by a boot engine provided by the BIOS, the partition locking key from a remote access controller device; and
storing, by the boot engine, the partition locking key in the hidden partition identified by the GPT.

* * * * *